Nov. 24, 1942.                P. KOLLSMAN                 2,303,285
                           ELECTRICAL INSTRUMENT
                         Filed March 12, 1940          3 Sheets-Sheet 1

INVENTOR
PAUL KOLLSMAN
BY
ATTORNEY

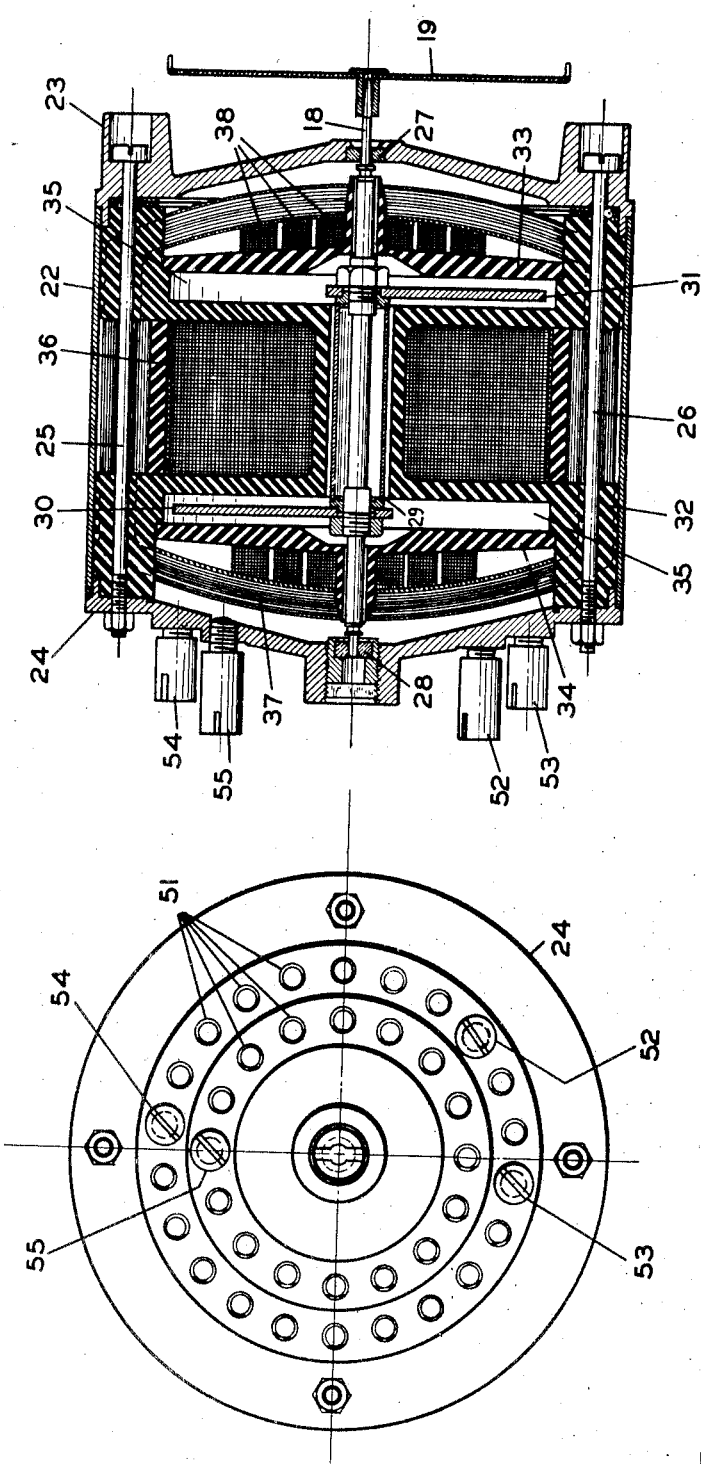

INVENTOR
PAUL KOLLSMAN
BY
ATTORNEY

Patented Nov. 24, 1942

2,303,285

UNITED STATES PATENT OFFICE 2,303,285

ELECTRICAL INSTRUMENT

Paul Kollsman, New York, N. Y., assignor to Square D Company, Inc., Detroit, Mich.

Application March 12, 1940, Serial No. 323,518

9 Claims. (Cl. 172—36)

This invention relates to improvements in electrical instruments consisting essentially of an armature rotatable relatively to field coils.

Instruments of this character are used for various purposes such as for transmitting a rotary motion or position to a remote location or for the purpose of repeating or indicating at a remote point a motion or position so transmitted.

Instruments of this character are also used for determining or indicating electrical data as, for example, the phase relation of one alternating current with respect to another and for various other purposes.

The armature in an instrument of the character described may assume various forms. It may be a movable coil capable of being magnetized or polarized by an electrical current passing therethrough. The armature may also assume the form of a permanent magnet or may be made of soft iron and magnetized or polarized by means of a magnetizing or polarizing winding.

It is an object of this invention to improve the accuracy of devices of the character described by compensating for errors which occur in the relative position between the armature and the field coils.

Such errors may be due to asymmetry of elements, for example, of the field windings or of the armature, or may be due to tolerances in the precise relative location of the elements. For example, in an instrument in which the armature is slightly eccentrically located with relation to the field windings or the magnetizing winding or a sleeve of magnetic material arranged in the path of the magnetic flux, the armature may assume positions which differ from the theoretically correct position.

It is thus, for example, possible that in a remote transmission system consisting of a transmitter and a repeater, the armature of the repeater differs by one or several degrees from the position of the armature of the transmitter thus rendering the remote indication unreliable.

According to the present invention, I compensate for errors in the position of the rotatable armature with respect to the field or other elements by providing one or several masses, generally of small dimensions, of magnetic material which are adjustably mounted with respect to the field windings. These masses of magnetic material locally modify the field created by the field windings and correct the position of the armature by local attraction between the armature and the respective compensating mass.

This invention may thus also be regarded as an improvement of the remote indicator disclosed in a prior patent to Paul Kollsman et al., No. 2,239,790, issued April 29, 1941.

Objects, aims and advantages of this invention will appear from a consideration of the description which follows with accompanying drawings showing for purely illustrative purposes an embodiment of this invention. It is to be understood, however, that the specification is not to be taken in a limiting sense, the scope of the invention being defined in the appended claims.

Referring to the drawings:

Fig. 2 is a vertical cross-section through the unit shown in Fig. 1 useful among other purposes as a transmitter or a repeater;

Fig. 3 is a rear elevation of the device shown in Fig. 2;

Figure 1:
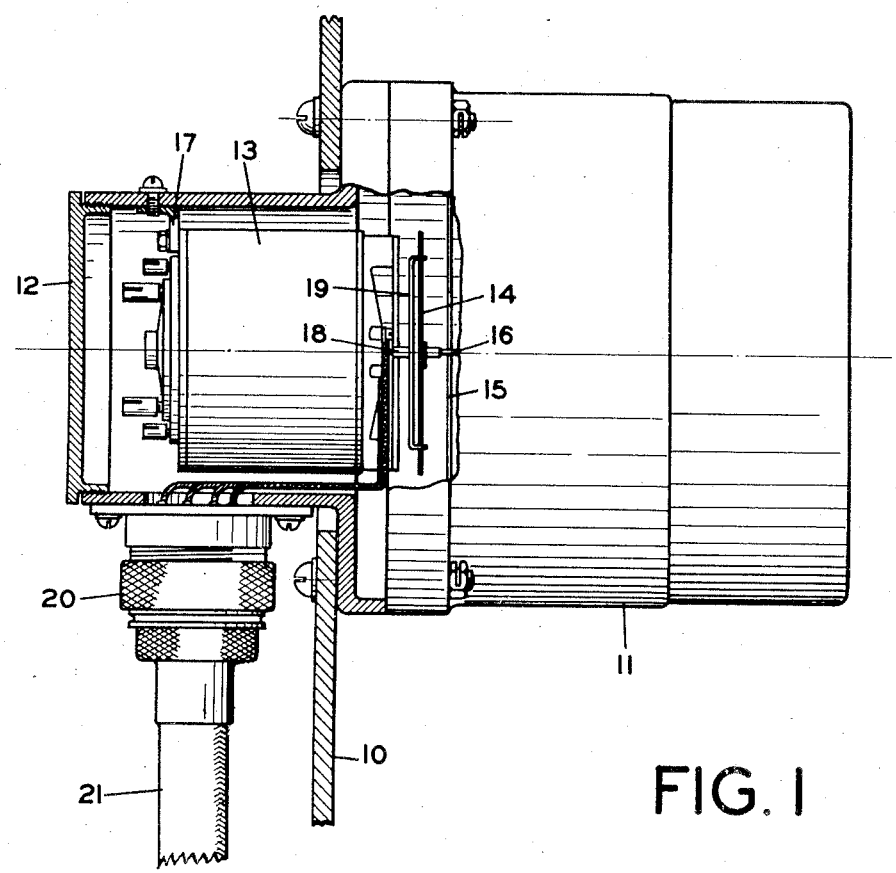
Fig. 1 illustrates partly in vertical cross-section the use of a device or unit of the character described as a transmitter in a remote indication system.

In the drawings the invention is illustrated as applied to a remote transmission system including a transmitter and a repeater of like structure. To a panel 10 there is mounted, in a manner not further illustrated, a standard instrument 11 which may be a pressure gage, a gyroscopic instrument or the like and a housing 12 enclosing a transmitter 13. The instrument 11 is shown as having a pointer 14 movable over a dial 15 and carried by a shaft 16. The transmitter 13 is mounted in the housing 12 by means of a bracket 17 and carries on its pointer shaft 18 a movable member 19 engaging the pointer 14. A cable coupling 20 is shown connecting a cable 21 to the transmitter. The transmitter is shown in greater detail in Figs. 2 and 3.

In the illustrated embodiment a casing is shown consisting of a shell 22 preferably of magnetic material such as iron, and end-bells 23 and 24. The shell and the end-bells are held together by means of bolts 25 and 26. The end-bells are shown as supporting bearings 27 and 28 for an armature.

In the illustrated embodiment the armature consists of a shaft 18 preferably of non-magnetic material. The shaft 18 carries a sleeve 29 of magnetic material to which there are connected two vanes 30 and 31 also of magnetic material and pointing in opposite directions thus forming a Z-shaped structure.

The armature is surrounded by field windings which, in the illustrated embodiment, are supported by an insulating core or body preferably of phenolic resin such as "Bakelite." The insulating body is illustrated as comprising a center piece 32 into which there are insertable end pieces 33 and 34. The end pieces form with the center piece a space or chamber 35 within which the armature is free to move.

A source of alternating current connected to the polarizing winding will magnetize the armature thus causing the vanes 30 and 31 to change their polarity in the cycle of the alternating current. In the illustrated embodiment the cylindrical shell 22 forms part of the path for the magnetic flux flowing between the opposite poles of the armature.

The insulating body supports a magnetizing or polarizing winding 36 which is coaxially arranged with the axis of the armature. At right angles to the axis of the winding 36 two field windings 37 and 38 are arranged, the axes of the field windings being at right angles to each other and to the axis of the magnetizing winding.

To insure an accurate location of the field windings, two groups of notches are provided in the insulating body, a first group of six notches 39 accommodating the field winding 37 and a second group of six notches 40, arranged at right angles to the first group of notches, accommodating the field winding 38.

Figure 6:
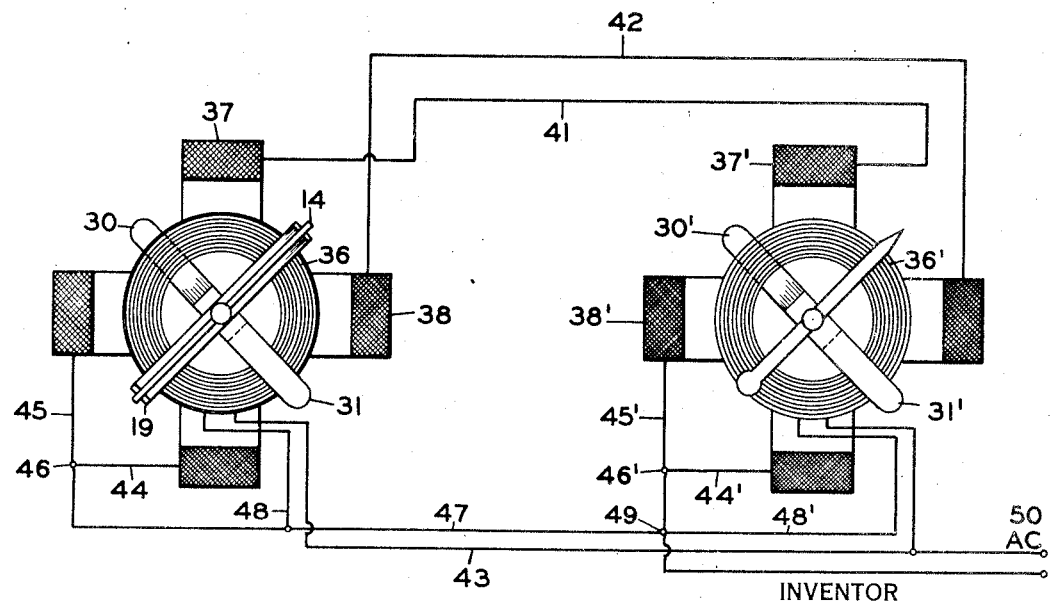
Fig. 6 is a wiring diagram illustrating the use of the device shown in Figs. 1 and 2 for the purpose of transmitting a rotary motion or position to a remote point.
Figure 4:
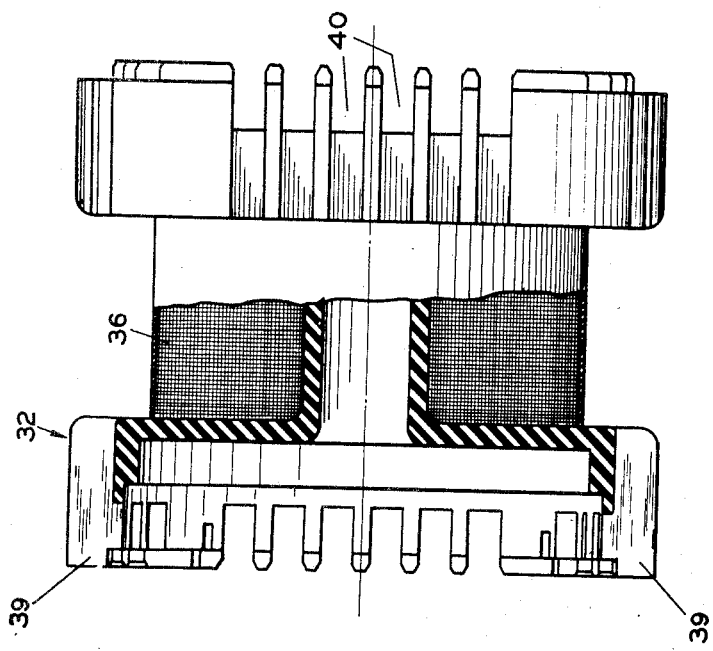
Fig. 4 is a partial cross-section through an insulating body or core of the unit shown in Fig. 2; a section being taken on line 4—4 in Fig. 5.
Figure 5:
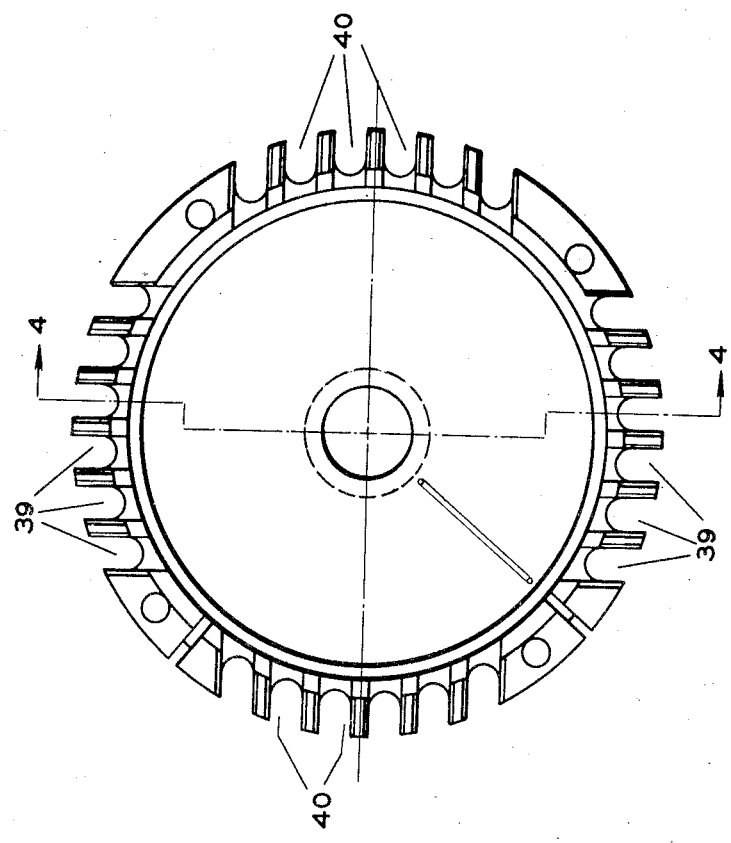
Fig. 5 is a front elevation of the body shown in Fig. 4.

The operation of the device illustrated in Fig. 2 is explained by referring to Fig. 6 in which at the left hand side a transmitter is shown while the structure at the right hand side represents a repeater. Transmitter and repeater are shown as being of identical structure. To identify parts in the repeater corresponding to parts in the transmitter, primed reference numerals are employed.

For connecting the transmitter and the repeater each including three windings, normally six leads would be required. It is, however, possible to reduce the number of leads from six to four by combining three return connections of the three windings into one. This simplified wiring is illustrated in Fig. 6.

The field winding 37 of the transmitter is connected to the field winding 37' of the repeater through a lead 41. The field winding 38 is connected to the field winding 38' through a lead 42. The polarizing winding 36 of the transmitter is connected to the corresponding winding 36' of the repeater through a lead 43.

Return leads 44 and 45 of field windings 37 and 38 are united at 46 and are connected to a common lead 47 to which also the remaining terminal 48 of the magnetizing winding 36 is connected. At the repeater side return leads 44' and 45' are united at 46' and connected to lead 47 at 49 at which point also the return lead 48' of the magnetizing winding 36' terminates.

It thus appears that corresponding windings of the repeater and the transmitter are connected in parallel. The magnetizing winding is further connected to a source of alternating current 50.

The operation of the remote transmission system is as follows:

The polarizing winding supplied with alternating current will polarize the armature in the cycle of the alternating current thereby inducing an E. M. F. in the field windings 37 and 38 depending upon the relative position of the vanes 30 and 31 of the armature relatively to the field windings. As the same E. M. F. exists at the terminals of the field windings of the repeater, the repeater armature polarized in the same cycle as the transmitter armature will assume the same relative position relatively to the field windings of the repeater. Thus, the repeater reproduces the positions and movements.

Due to tolerances in manufacture such as tolerances in the correct relative location of the field windings and the armature, the armature of the repeater may deviate slightly from the position of the transmitter. Such errors in the position may be of the order of one or several degrees.

To compensate for such errors a mass of magnetic material is adjustably mounted relatively to the field windings for locally modifying the field created by the field windings. In the illustrated embodiment the end-bell 24 is shown as provided with tapped holes 51 into which screw threaded plugs may be inserted, four plugs 52, 53, 54, 55 being shown. The plugs may be made of various sizes and forms depending upon the amount of compensation required. A larger plug will naturally exert a greater influence on the vane of the armature moving in proximity thereto than a plug of smaller size.

In compensating, the position of the pointer is checked against the position of the pointer of the transmitter. When a deviation is found to exist at a particular position of the pointer, a compensating plug held with a tool of non-magnetic material is slowly moved along a circle of tapped holes in the end-bell until a position is found in which the pointer will be deflected towards one side or the other.

Assuming, for example, the error in the position of the pointer was −4°, it is possible to find a position in which the presence of the compensating plug will cause a movement of the pointer in a direction to reduce this error. By choosing the proper size of plug the magnitude of the correction can be easily varied.

Tests have shown that errors of an instrument of the order of ±4° can be reduced to less than ±1° and thus an instrument be obtained which in spite of its miniature size and weight is extremely accurate.

Obviously the present invention is not restricted to the particular embodiments herein shown and described. Other forms of instruments having a movable coil armature instead of an armature of magnetic material may be compensated in the same manner. Likewise other ways of securing magnetic compensating masses may be employed without departing from the spirit of the invention.

What is claimed is:

1. A device of the character described comprising, in combination, a plurality of field windings the axes of which are disposed at an angle relatively to each other; a Z-shaped armature of magnetic material rotatable relatively to, and within the field of, said field windings; an energizing winding arranged to polarize said armature; and a mass of magnetic material adjustably mounted with respect to said field windings for locally modifying the field created by said field windings.

2. A device of the character described comprising, in combination, two field windings the axes of which are disposed at right angles to each other; a Z-shaped armature of magnetic material surrounded by said field windings and having an axis of rotation normal to the axes of said field windings; an energizing winding having an axis parallel with the axis of rotation of said armature for polarizing said armature; a cylindrical shell of magnetic material surrounding said windings and having an axis parallel with the axis of the armature; and an additional mass of magnetic material adjustably mounted with respect to said field windings for locally modifying the field created by said field windings.

3. A device of the character described comprising, in combination, a casing including a cylindrical shell of magnetic material and two end-bells of non-magnetic material; two field windings within said casing the axes of which are at right angles to each other and to the axis of said cylindrical shell; a Z-shaped armature of magnetic material mounted within said casing coaxial with said shell; an energizing winding having an axis parallel with the axis of rotation of said armature for polarizing said armature; and a small mass of magnetic material adjustably mounted to one of said end-bells for locally modifying the field created by said field windings.

4. A device of the character described comprising, in combination, a casing including a cylindrical shell of magnetic material and two end-bells of non-magnetic material, at least one of said end-bells having screw threaded apertures; two field windings within said casing the axes of which are at right angles to each other and to the axis of said cylindrical shell; a Z-shaped armature of magnetic material mounted within said casing coaxial with said shell; an energizing winding having an axis parallel with the axis of rotation of said armature for polarizing said armature; and a plurality of screw threaded plugs of magnetic material screwed into said threaded apertures for locally modifying the field created by said field windings.

5. A device of the character described comprising, in combination, a casing including a cylindrical shell of magnetic material and two end-bells of non-magnetic material; a plurality of field windings within said casing the axes of which are at an angle relatively to each other and normal to the axis of said cylindrical shell; an armature coaxially mounted within said casing for movement relatively to said field windings; and a mass of magnetic material of preselected size including means for mounting said mass to one of said end-bells so as to place the center of said mass in any of a number of available positions arranged substantially continuously throughout 360° about, and at varying distances from, the rotor axis.

6. A device of the character described comprising, in combination, a casing including a cylindrical shell of magnetic material and two end-bells of non-magnetic material; a plurality of field windings within said casing the axes of which are at an angle relatively to each other and normal to the axis of said cylindrical shell; a Z-shaped armature of magnetic material coaxially mounted within said casing for movement relatively to said field windings; and a mass of magnetic material adjustably mounted to one of said end-bells for locally modifying the field created by said field windings.

7. A device of the character described comprising, in combination, a casing including a substantially cylindrical shell of magnetic material and two end-bells of non-magnetic material, at least one of said end-bells having screw threaded apertures; a plurality of field windings within said casing the axes of which are disposed at an angle relatively to one another and at right angles to the axis of said shell; an armature rotatable relatively to, and within the field of said field windings; and a plurality of screw threaded plugs of magnetic material screwed into said threaded apertures for locally modifying the field created by said field windings.

8. A device of the character described comprising, in combination, a plurality of field windings the axes of which are disposed at an angle relatively to one another; an armature capable of being magnetized, rotatable relatively to, and within the field of, said field windings; a mass of preselected size of magnetic material for locally modifying the field created by said field windings; and means for securing said mass in but one plane with respect to said field windings so as to place the center of said mass in any of a number of available positions arranged substantially continuously throughout 360° in said plane about, and at varying distances from, the rotor axis, whereby the angular position of the rotor relatively to the field windings may be locally corrected throughout its range of rotation of 360°.

9. A device of the character described comprising, in combination, a plurality of field windings the axes of which are disposed at an angle relatively to one another; an armature capable of being magnetized, rotatable relatively to, and within the field of, said field windings; an energizing winding arranged to polarize said armature; a mass of magnetic material of preselected size for locally modifying the field created by said field windings; and means for securing said mass in but one plane with respect to said field windings so as to place the center of the mass in any one of a plurality of available positions distributed in said plane and substantially evenly throughout 360° about the rotor axis and at varying distances from the rotor axis, whereby the angular position of the rotor relative to the field windings may be locally corrected.

PAUL KOLLSMAN.